Patented Dec. 21, 1943

2,337,432

UNITED STATES PATENT OFFICE 2,337,432

CATALYSIS

Preston L. Veltman, Fishkill, N. Y., assignor to The Texas Company, New York, N. Y., a corporation of Delaware No Drawing. Application January 6, 1942, Serial No. 425,749

7 Claims. (Cl. 196—54)

This invention relates to a catalyst for the conversion of hydrocarbons and particularly to a catalyst for the conversion of higher molecular weight hydrocarbons into lower molecular weight hydrocarbons suitable for the manufacture of motor fuel.

The present application is a continuation-in-part of pending application Serial No. 350,097, filed August 2, 1940, for Catalysis, which issued as Patent No. 2,286,129 on June 9, 1942.

The invention contemplates effecting conversion of higher molecular weight hydrocarbons into lower molecular weight hydrocarbons by the action of a catalyst comprising a metallic halide containing two or more different halogen atoms, namely, fluorine, chlorine, bromine or iodine, combined with one metal in the same molecule, and which will be defined herein as a mixed metallic halide. Examples of such catalysts comprise aluminum dichloro fluoride, aluminum chloro difluoride, aluminum chloro pentafluoride ($Al_2ClF_5$) and mixtures of molecules of this nature. Hydrogen halide, boron halide or alkyl halides may be used as a promoter for the mixed metallic halide catalyst.

The mixed halides of this invention, including hydrated forms thereof, may be employed alone or in combination with other catalytic agents or with suitable carrier or supporting materials, or may be dissolved or dispersed in suitable liquid media. Thus, these mixed metallic halides may be employed in conjunction with simple metallic halides of the type $AlCl_3$, $SbCl_3$, etc. Examples of suitable carriers comprise natural or artificial clays, such as aluminum silicates and fuller's earth. Other materials include silica, alumina, diatomaceous earth, bauxites, aluminum phosphate and the like, including mixtures thereof. Suitable liquid media would include inorganic salts of relatively low melting point, such as $SbCl_3$ and $SbF_5$, metallic organic compounds, and organic compounds capable of carrying the catalyst in suspension or in solution. Certain metallic halide-hydrocarbon complexes may also serve as carriers for the catalysts described herein such as the complex often formed during the isomerization of hydrocarbons with metallic halides.

Also it is contemplated that the catalyst may be used in a finely powdered form suspended in a stream of hydrocarbon vapor or gas undergoing treatment by contact with the suspended catalyst.

It is already known to employ a metallic halide, such as aluminum chloride, as a catalyst for effecting cracking, isomerization, polymerization and alkylation of hydrocarbons. Aluminum chloride, promoted with hydrogen chloride, is an effective catalyst in such reactions, but its employment may be attended with certain difficulties, such as a tendency toward formation of sludge by-products. Moreover, aluminum chloride has appreciable solubility in liquid hydrocarbons so that in liquid phase operations considerable migration of the catalyst occurs. Also, it has a tendency to sublime in a reaction system where vaporized hydrocarbons are being treated with the catalyst in solid form.

A complex metallic halide, such as fluorinated aluminum chloride, as contemplated by the present invention, provides a catalyst which is superior to ordinary aluminum chloride with respect to resistance to sludging and subliming tendencies. It is less soluble in mineral oil and also requires a higher temperature for sublimation.

A quantity of aluminum chloro-fluoride catalyst was prepared by subjecting anhydrous aluminum chloride vapors at the sublimation temperature at atmospheric pressure to intimate contact with boron trifluoride in a glass tube so as to form a mixed aluminum chloro-fluoride salt and boron trichloride. The aluminum chloride and boron trifluoride were charged to the reaction in the proportion of 261.5 parts by weight of anhydrous aluminum chloride to 55 parts of boron trifluoride, the resulting solid product amounting to 228.5 parts by weight. These proportions can be changed so as to vary the amount of fluorine substituted for chlorine in the original aluminum chloride. The amount of boron trifluoride added was somewhat in excess of that theoretically required to form a compound having the formula $AlCl_2F$.

A bright yellow crystalline material was formed as an intermediate product which melted and decomposed during continued heating to give the mixed halides and $BCl_3$. The boron trichloride was condensed and recovered quantitatively in a trap cooled in a bath comprising a mixture of dry ice and kerosene.

The solid product finally obtained had a grey-white appearance, sublimed at a much higher temperature than aluminum chloride, dissolved slowly in water, and apparently is substantially insoluble in paraffinic hydrocarbons and alkyl halides. Its chemical analysis corresponds approximately to a mixed halide having a stoichiometric formula of $AlCl_2F$, and is substantially free from boron and boron halides. The chemical reaction forming this catalyst apparently involves a process of double decomposition as indicated by the following equations:

$$3AlCl_3 + BF_3 \rightarrow 3AlCl_2F + BCl_3 \uparrow$$
$$3AlCl_2F + BF_3 \rightarrow 3AlClF_2 + BCl_3 \uparrow \text{ etc.}$$

Mixed metallic halides can be prepared by simple partial replacement reactions using elemental halogens. The ability to displace one another from salts decreases in the order of fluorine, chlorine, bromine and iodine. That is, fluorine can displace chlorine, bromine and iodine, while chlorine can displace only bromine and iodine. Bromine can displace iodine only. By suitable selection of salts and control of the conditions under which the reaction is effected substantially any halogen ratio can be obtained in a single salt.

It is contemplated that many non-metallic fluorine compounds can be used as a source of fluorine. Hydrogen fluoride, silicon tetrafluoride and organic fluorides react, at moderate temperatures, with metal salts, such as aluminum chloride, to give aluminum chloro fluoride which comprises one of the type of catalysts contemplated herein.

A sample of this catalyst was employed as an isomerization and cracking catalyst in which normal pentane was subjected to conversion by contact with the catalyst at a relatively low temperature. In this experiment 1224 parts of normal pentane, 135.1 parts of catalyst and 5.9 parts of water by weight, were charged to a reaction vessel. The mixture was maintained in the vessel at a temperature of about 160° F. for a period of about four hours, the pressure ranging from about 40 to 117 pounds per square inch gauge.

As a result of this treatment the hydrocarbon product comprises 96.7% by weight of the normal pentane charge. The remaining 3.3% of the charge was in the form of a metallic halide-hydrocarbon-water mixture.

The hydrocarbon product was subjected to a low temperature fractional distillation, obtaining the following fractions and yields thereof, expressed as mol per cent:

| | Mol per cent |
|---|---|
| Hydrocarbons boiling below isobutane | 0.1 |
| Isobutane | 53.0 |
| n-Butane | 4.7 |
| Isopentane | 20.5 |
| n-Pentane | 5.4 |
| Hydrocarbons boiling above n-pentane | 16.3 |

The foregoing analysis demonstrates that the catalyst is highly active for catalyzing either isomerization or cracking reactions.

In another example a mixed halide catalyst containing 28.0% aluminum, 47.4% chlorine, 24.4% fluorine, a trace of ferric oxide and silicon oxide and substantially free from boron was prepared and employed as a catalyst for cracking a gas oil distilled from East Texas crude. The gas oil had an A. P. I. gravity of 28.1 and an initial boiling point of about 622° F., at least 90% of the oil distilling over at a temperature of about 760° F. at atmospheric pressure. Prior to contact with the catalyst the gas oil had been clay treated at 250° F. with a solid adsorptive decolorizing clay so that the carbon residue of the clay treated gas oil was 0.04%.

A quantity of this clay treated gas oil was charged to a reaction vessel. The catalyst was added to the oil in the vessel to the extent of about 5% by weight of the charge oil. The mixture of oil and catalyst was subjected to continuous agitation and maintained at a reaction temperature in the range about 600 to 690° F. for a period of one and two-thirds hours.

The yield of gasoline hydrocarbons boiling up to 400° F. obtained as a result of the conversion, amounted to 31.1% by weight of the gas oil.

In still another example, a catalyst having the same composition as that used in the preceding example was employed to crack a lighter gas oil derived from South Texas crude. This gas oil had an A. P. I. gravity of 25.0 and an initial boiling point of about 422° F., 90% of the oil distilling over at 760° F. and atmospheric pressure.

This gas oil was subjected in a batch operation to the action of the catalyst at a temperature in the range 390 to 480° F. for a period of about three hours, the amount of catalyst employed being 5% by weight of the feed oil.

As a result of the conversion, there was obtained a yield of 49% by volume of gasoline boiling up to 400° F. The fraction of the gasoline boiling up to an end point of 350° F. amounted to 27.4% by volume of the feed oil. A relatively high proportion of the gasoline product obtained boiled in the range about 350 to 400° F. and thus constituted a relatively high yield of gasoline hydrocarbons suitable as a blending stock for safety fuel.

While batch liquid phase operations have been described, nevertheless it is contemplated that the catalyst may be employed in vapor phase operations and also in continuous flow operations, in which a short time of reaction is employed.

In liquid phase operations the cracking temperatures may range from about 300 to 400° F. to 700° F. and above. When cracking in the vapor phase, as when passing a heated feed hydrocarbon in vapor phase through a reaction zone containing a catalyst in solid fragmentary form, the reaction temperature may be of the order of 850 to 1000° F.

In vapor phase cracking at relatively high temperatures it is contemplated maintaining a relatively short time of contact between the catalyst and the hydrocarbons undergoing conversion. Thus, the time of contact may be substantially instantaneous, i. e., a matter of a few seconds or a fraction of a second.

While a mixed halide of aluminum has been described above, it is nevertheless contemplated that mixed halides of other metals capable of combining with two or more halogen atoms may be used. Polyvalent metals in groups 2, 3, 4, 5 and 6 of the periodic table including iron, cobalt, nickel and the noble metals are capable of being prepared in the metal-mixed halide form. It is contemplated that the mixed halide compound may be a metallic halide which is either lightly or heavily fluorinated. It may have an empirical formula such as $MeH^1_x H^2_y$ where x and y have values sufficient to satisfy the valency of the particular metal in question, and $H^1$ and $H^2$ are different halogen atoms connected to the same metal atom as, for example $SbCl_2F$, $SbCl_2Br$, $SbClF_2$, etc., and mixtures thereof.

Also it is contemplated that the catalyst of this invention may comprise a mixture of mixed halide compounds of two or more different metals.

It is also contemplated that the oil may be treated with the catalyst in the presence of hydrogen or hydrogen-containing gases or in the presence of oxygen or oxygen-containing gases such as carbon monoxide and carbon dioxide or other agents for the purpose of modifying or controlling the extent of the conversion reaction or of controlling the extent of carbon deposition on the catalyst.

When employing the catalyst as a solid contact mass in a reaction zone, it is contemplated subjecting the catalyst to regeneration at intervals as is done in the conventional catalytic cracking operation. Such regeneration may be effected with oxygen, oxygen-containing gases or other gaseous agents. For example, the regeneration may involve burning off deposed carbon by treatment under reactivating conditions with a stream of carbon monoxide or with other oxygen-containing gas after which the catalyst mass may be flushed and treated with hydrogen fluoride.

Obviously many modifications and variations of the invention as above set forth may be made without departing from the spirit and scope thereof, and therefore only such limitations should be imposed as are indicated by the appended claims.

I claim:

1. A method of converting higher molecular weight hydrocarbons into lower molecular weight hydrocarbons including gasoline hydrocarbons which comprises subjecting higher molecular weight hydrocarbons to contact with an active catalyst comprising a metallic mixed halide containing at least two different halogen atoms in the same molecule and connected to the same metal atom and effecting said contact under cracking conditions such that substantial conversion of feed hydrocarbons to gasoline hydrocarbons is secured.

2. The method according to claim 1 in which the conversion reaction is effected at a temperature in the range about 300 to 1000° F.

3. A method of converting higher molecular weight hydrocarbons into lower molecular weight hydrocarbons including gasoline hydrocarbons which comprises subjecting higher molecular weight hydrocarbons to contact with an active catalyst comprising a metallic mixed halide containing at least two different halogen atoms in the same molecule, having the approximate empirical formula $$MeH^1_xH^2_y$$

where Me signifies a metal, $H^1$ and $H^2$ signify different halogen atoms and $x$ and $y$ have values sufficient to satisfy the valency of the metal, and effecting said contact under cracking conditions such that substantial conversion of feed hydrocarbons to gasoline hydrocarbons is secured.

4. The method according to claim 3 in which the conversion reaction is effected at a temperature in the range 300 to about 1000° F.

5. The method according to claim 3 in which the catalyst comprises aluminum mixed halide containing chlorine and fluorine atoms in the same molecule.

6. In the catalytic conversion of normally liquid hydrocarbons at cracking temperatures to form gasoline hydrocarbons, the method comprising subjecting the normally liquid hydrocarbons while in the vapor phase to contact with an active catalyst comprising a metallic mixed halide containing at least two different halogen atoms in the same molecule and connected to the same metal atom, and effecting said contact at a temperature in the range about 850 to 1000° F. such that substantial conversion of feed hydrocarbons to gasoline hydrocarbons is secured.

7. In the catalytic conversion of normally liquid hydrocarbons at cracking temperatures to form gasoline hydrocarbons, the method comprising subjecting the normally liquid hydrocarbons while in the vapor phase to contact with an active catalyst comprising a mixed halide of aluminum containing chlorine and fluorine atoms in the same molecule and connected to the same metal atom, and effecting said contact at a temperature in the range about 850 to 1000° F. such that substantial conversion of feed hydrocarbons to gasoline hydrocarbons is secured.

PRESTON L. VELTMAN.